United States Patent [19]

Shropshire

[11] Patent Number: 4,490,494

[45] Date of Patent: Dec. 25, 1984

[54] DYEABLE POLYMER ALLOY FIBERS CONTAINING A POLYMERIC DYE-RECEPTOR AND A METAL SALT OF A CARBOXYLIC ACID

[75] Inventor: Robin D. Shropshire, Winnsboro, S.C.

[73] Assignee: Phillips Petroleum Company, Bartlesville, Okla.

[21] Appl. No.: 562,029

[22] Filed: Dec. 15, 1983

Related U.S. Application Data

[63] Continuation of Ser. No. 366,108, Apr. 6, 1982, abandoned, which is a continuation of Ser. No. 171,920, Jul. 24, 1980, abandoned, which is a continuation of Ser. No. 596,486, Jul. 16, 1975, abandoned, which is a continuation of Ser. No. 427,209, Dec. 21, 1973, abandoned, which is a continuation-in-part of Ser. No. 273,619, Jul. 20, 1972, abandoned, which is a continuation-in-part of Ser. No. 207,637, Dec. 13, 1971, abandoned.

[51] Int. Cl.$^3$ .................. C08L 5/09; C08L 23/12
[52] U.S. Cl. ...................... 524/87; 524/394; 524/399; 524/396; 524/304; 525/128; 525/130; 525/177; 525/184; 525/186; 525/195; 525/203; 525/204; 525/217; 525/227
[58] Field of Search .............. 524/396, 87; 525/128, 525/177, 184, 195, 204, 217

[56] References Cited

U.S. PATENT DOCUMENTS

| | | | |
|---|---|---|---|
| 2,770,518 | 11/1956 | Conciatori et al. | 8/18 |
| 2,984,634 | 5/1961 | Caldwell et al. | 260/23 |
| 3,153,106 | 10/1964 | Schlick | 264/78 |
| 3,207,736 | 9/1965 | Wijga | 260/93.7 |
| 3,207,739 | 9/1969 | Wales | 260/93.7 |
| 3,215,486 | 11/1965 | Hada et al. | 8/74 |
| 3,240,552 | 3/1966 | Joyner et al. | 8/39 |
| 3,245,751 | 4/1966 | Bonvicini | 8/100 |
| 3,268,499 | 8/1966 | Wales | 260/93.7 |
| 3,312,755 | 4/1967 | Cappuccio et al. | 260/859 |
| 3,361,843 | 1/1968 | Miller | 260/857 |
| 3,367,926 | 2/1968 | Voeks | 260/93.5 |
| 3,382,305 | 5/1968 | Breen | 264/171 |
| 3,395,198 | 7/1968 | Taniguchi et al. | 260/897 |
| 3,413,249 | 11/1968 | Luftglass et al. | 260/23 |
| 3,433,853 | 3/1969 | Earle et al. | 260/857 |
| 3,439,999 | 4/1969 | Miller | 8/15 |
| 3,482,926 | 1/1969 | Cappuccio | 8/115.5 |
| 3,502,422 | 3/1970 | Miller et al. | 8/4 |
| 3,551,401 | 12/1970 | Fujisaki et al. | 260/93.7 |
| 3,555,805 | 1/1971 | Thomas | 57/140 |
| 3,772,411 | 11/1973 | Uzelmeier et al. | 260/897 B |

FOREIGN PATENT DOCUMENTS

| | | |
|---|---|---|
| 282158 | 12/1967 | Australia . |
| 423259 | 4/1969 | Australia . |
| 627346 | 9/1961 | Canada . |
| 690402 | 7/1964 | Canada . |
| 709302 | 5/1965 | Canada . |
| 849612 | 8/1970 | Canada . |
| 1320986 | 2/1963 | France . |
| 1327339 | 4/1963 | France . |
| 1330784 | 5/1963 | France . |
| 13-26766 | 3/1937 | Japan . |
| 15-291 | 1/1940 | Japan . |
| 15-5215 | 3/1940 | Japan . |
| 16-7449 | 4/1941 | Japan . |
| 16-14578 | 8/1941 | Japan . |
| 17-3184 | 2/1942 | Japan . |
| 38-20489 | 10/1963 | Japan . |
| 932897 | 7/1963 | United Kingdom . |
| 1029447 | 2/1965 | United Kingdom . |
| 1007753 | 10/1965 | United Kingdom . |
| 1066460 | 4/1967 | United Kingdom . |
| 1078585 | 8/1967 | United Kingdom . |
| 1082584 | 9/1967 | United Kingdom . |
| 1104059 | 2/1968 | United Kingdom . |
| 1157500 | 7/1969 | United Kingdom . |
| 1178506 | 1/1970 | United Kingdom . |
| 1197277 | 7/1970 | United Kingdom . |

Primary Examiner—Carman J. Seccuro
Attorney, Agent, or Firm—French & Doescher

[57] ABSTRACT

Improved dyeability of alpha-monoolefin polymers is obtained by incorporating in the olefin polymer a polymeric dye receptor and a small amount of a carboxylic acid metal salt.

32 Claims, No Drawings

DYEABLE POLYMER ALLOY FIBERS CONTAINING A POLYMERIC DYE-RECEPTOR AND A METAL SALT OF A CARBOXYLIC ACID

This application is a continuation of application Ser. No. 366,108, filed Apr. 6, 1982, now abandoned; which was a continuation of Ser. No. 171,920, filed July 24, 1980, now abandoned; which was a continuation of Ser. No. 596,486, filed July 16, 1975, now abandoned; which was a continuation of Ser. No. 427,209, filed Dec. 21, 1973, now abandoned; which was a continuation-in-part of Ser. No. 273,619 filed July 20, 1972, now abandoned; which was a continuation-in-part of Ser. No. 207,637, filed Dec. 13, 1971, now abandoned.

This invention relates to dyeable polymer alloy fibers.

In one of its more specific aspects, this invention relates to dyeable olefinic polymers and, in particular, to polypropylene.

The difficulty of dyeing olefin polymers is well known. Considerable attention has been directed to the solution of this problem as reflected by such patents as U.S. Pat. Nos. 3,107,228, 3,312,755 and 3,361,843.

In general, these patents product a dyeable composition by blending with the olefin polymer, dye receptors such as those delineated in the above patents. These include polyamides which are polycondensates of cyclic amides, and polyamides which are polycondensates of aliphatic diamines with dicarboxylic acids, polyurethanes, polyureas, polyesters which are polycondensates of alkylene glycols with dicarboxylic acids, reaction products of polyalkyleneimines containing 2 to 20 carbon atoms with a substance selected from the group consisting of chlorinated paraffin waxes, diisocyanates, lower aliphatic acid anhydrides, hydrohalogen acids and monobasic fatty acid chlorides.

Such dye receptors include mixtures of a polyalkyleneimine in which the alkylene group contains from 2 to 20 carbon atoms with the reaction product of epoxy resin obtained by reacting epichlorohydrin and 4,4'-dioxyphenyldimethyl-methane and monoethanolamine. Such dye receptors also include thermoplastic polymers of vinyl-substituted mono- and polycyclic pyridine bases, thermoplastic polyamides, including condensation homopolymers and copolymers having pendent groups, containing or consisting of amide groups, and amine polymers, including condensation homopolymers and copolymers, in which the amine group is an integral part of the polymer chain, and addition homopolymers and copolymers having pendent groups which include or consist of amine groups and other basic nitrogen polymers such as polyurethanes, polyureas, poly(vinyl carbazoles) and aniline-formaldehyde resins.

It has now been discovered that the extent to which such alphamonoolefin polymers are made dyeable by the inclusion of such dye receptors as those maintained is unexpectedly extended if there is included in the blend of the alloy, that is, in the blend of the olefinic polymer and the dye receptor, a metal carboxylate, that is, a carboxylic acid metal salt such as potassium benzoate, lithium benzoate and sodium benzoate.

As mentioned, this invention is applicable to any of the olefin polymers but is particularly applicable to polypropylene. In general, any dye receptor which when blended with an alpha-monoolefin improves the dye receptivity of the alpha-monoolefin, can be used in this invention.

The olefin polymer will have blended with it any of the aforementioned polymers such as polyamides, polyurethanes and the like as recited in U.S. Pat. Nos. 3,107,228, 3,312,755 and 3,361,843, which substances are referred to hereinafter generally as "dye receptors". The blend of the olefin polymer and the dye receptor will be comprised of up to about 50 weight percent of the dye receptor, an amount in the range of from 1 to about 40 weight percent being preferably employed, the olefin polymer and the dye receptor containing stabilizers, antioxidants and other constituents in conventional amounts.

Preferred dye receptors are polyamides such as nylon-6,6, nylon-6,10, nylon-6, du Pont's Zytel 63, a polymer consisting of nylon-6,6, nylon-6,10 and nylon-6 in a ratio of about 40:40:20, and du Pont's Acid Dye Additive PB 7007, a copolymer of ethylene and an amino alkyl acrylate, specifically a 70/30 ethylene/N,N-dimethylaminoethyl methacrylate copolymer.

Any metal salt of carboxylic acid metal salt which contains 4 to 18 carbon atoms can be used. Suitable carboxylic acids are benzoic acid, p-t-butylbenzoic acid, phenylacetic acid, mellitic acid, 1,8-naphthalic acid, o-phthalic acid, 1,2-cyclohexanedicarboxylic acid, adipic acid, succinic acid, and camphoric acid, stearic acid, and the like. Preferred metals are those of Group IA and Group IIIA of the Periodic Table. It is preferred that the metal salt be finely divided for best results. For example, it is desirable that the salt can pass through a 100 mesh screen or finer, i.e., 325 mesh screen.

Examples of suitable metal salts include sodium benzoate, potassium benzoate, lithium benzoate, sodium stearate, potassium adipate, lithium phenylacetate, aluminum hydroxy p-t-butylbenzoate, and the like. The carboxylic acid metal salt will be employed in an amount up to about 3 weight percent based upon the polyolefin content of the polymeric blend although amounts within the range of from about 0.25 to 1 weight percent are preferred.

The blend of the olefin polymer, the dye receptor and the carboxylic acid metal salt can be prepared in any manner resulting in a homogeneous mixture. Preferably, the olefin polymer and dye receptor are melt blended and the salt is mixed into the blend. Preferred blends contain from about 89.5 to 97 weight percent polypropylene, about 3 to about 10 weight percent of Dye Additive PB 7007, and about 0.25 to 1 weight percent sodium benzoate.

Olefin polymers, and especially polypropylene, require protection against thermal and oxidative degradation and hindered phenolic antioxidants such as Irganox 858, 1010, 1076, and 1093 are excellent for this purpose. These materials are manufactured by the Geigy Chemical Corporation, as disclosed in U.S. Pat. No. 3,285,855, and are, respectively, 2,4-bis(4-hydroxy-3,5-di-t-butylphenoxy)-6-(n-octylthio)-1,3,5-triazine, tetrakis [methylene(3,5-di-t-butyl-4-hydroxyhydrocinnamate)]methane, octadecyl[3-(3,5-di-t-butyl-4-hydroxyphenyl)]-propionate and di-n-octadecyl(3,5-di-t-butyl-4-hydroxybenzyl)phosphonate. These antioxidants are particularly effective because of their low volatility and long term beneficial effects. Other hindered phenols such as BHT(2,6-di-t-butyl-4-methylphenol), Ethyl 330 (Ethyl Corp.), 1,3,5-trimethyl-2,4,6-tris(3,5-di-t-butyl-4-hydroxybenzyl)benzene can also be used. These primary antioxidants are generally used in amounts ranging from about 0.005 to about 1 weight percent, based on total composition, and more preferably from about 0.02 to about 0.5 weight percent.

A second antioxidant to supplement or augment the effectiveness of the primary one is generally used in polypropylene formulations. A particularly effective class of such compounds are the diesters of beta,beta'-dithiopropionic acid. Especially preferred for this purpose are dilaurylthiodipropionate (DLTDP) and distearylthiodipropionate (DSTDP). These compounds are used in amounts ranging from about 0.02 to about 3 weight percent, based on total composition, and more preferably from 0.05 to about 1.5 weight percent.

A processing aid is generally used in preparing fibers from polypropylene compositions. This material is an alkaline earth metal stearate, preferably calcium stearate. These compounds are used in amounts ranging from about 0.005 to about 2 weight percent, based on total composition, and more preferably from about 0.02 to about 0.5 weight percent.

A UV stabilizer is required to impart light stability and dye lightfastness to the compositions. The hydroxybenzotriazoles are effective when used for this purpose. These compounds are represented by the following generic formula:

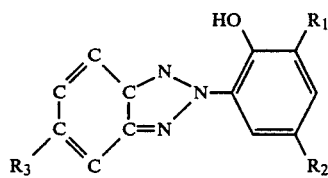

in which $R_1$ and $R_2$ can be hydrogen or an alkyl group containing from 1 to 12 carbon atoms with at least one $R_1$ or $R_2$ being an alkyl group and $R_3$ is a halogen such as chlorine or hydrogen. Particularly preferred is the combination wherein $R_1$ and $R_2$ are $C_5$ and $R_3$ is hydrogen. This compound is 2(2'-hydroxy-3',5'-di-t-amylphenyl)benzotrizole (Tinuvin 328). The UV stabilizer is used in amounts ranging from about 0.1 to about 2 weight percent, based on total composition, and more preferably from about 0.25 to 1.5 weight percent.

A presently preferred composition consists of:

| | |
|---|---|
| Polypropylene | 91.7 weight percent |
| Polymer dye receptor (du Pont PB 7007) | 7.0 weight percent |
| Sodium benzoate | 0.5 weight percent |
| UV stabilizer (Tinuvin 328) | 0.5 weight percent |
| Antioxidant (DSTDP) | 0.2 weight percent |
| Antioxidant (Irganox 1010) | 0.05 weight percent |
| Calcium stearate | 0.05 weight percent |

When any of the usually employed dye receptors are blended with an olefin polymer, there is formed an alloy which possesses a dyeability greater than that possessed by the olefin polymer in respect to disperse and acid dyes but substantially no greater than that possessed by the olefin polymer in respect to cationic dyes.

When sodium benzoate is introduced into the blend of the dye receptor and olefin polymer, there is formed a polymeric composition which possesses a dyeability greater than that possessed by the composite of the olefin and the dye receptor in respect to acid dyes but substantially no greater than that of the composite in respect to cationic dyes, and disperse dyes.

The invention is exemplified by the following examples which are not intended to limit the invention.

EXAMPLE I

Blends of polypropylene and Zytel 63, a polyamide manufactured by du Pont, were prepared by melt blending, the blends differing in respect to their polyamide content. To individual portions of these blends, sodium benzoate was added.

All samples were dyed in the same bath with 3 percent owf of Merpacyl Blue SW anionic dye (C.I. 62105), at a pH of 3.5 and a bath liquor ratio of 70:1.

K/S color determinations were made, these employing a colorant-mixture computer devised by Davidson and Hemmendinger, an analogy instrument employing the Kubelka-Munk K/S function. The results are presented below with the higher K/S color values indicating the greater dyeability.

TABLE I

| Polypropylene, Wt. % | Dye Receptor, Wt. % | Sodium Benzoate, Wt. % | K/S Color |
|---|---|---|---|
| 100 | 0 | 0 | — |
| 80 | 20 | 0 | 2.57 |
| 79 | 20 | 1 | 13.7 |
| 84 | 15 | 1 | 8.12 |
| 89 | 10 | 1 | 4.26 |

These data indicate the magnitude of the improvement upon addition of sodium benzoate. It will be seen that the addition of 1% sodium benzoate to the blend more than compensated for the removal of 10 weight percent of the dye receptor from the blend.

EXAMPLE II

Blends of polypropylene and Rhodiaceta DD Nylon 66, a polyamide dye receptor, were prepared by melt blending, the blends differing in respect to their polyamide content. To individual portions of these blends sodium benzoate was added.

All samples were dyed in the same bath with 3% owf Merpacyl Blue SW (Color Index Number 62105) at a pH of 3.5. Results were as follows:

TABLE II

| Polypropylene, Wt. % | Dye Receptor, Wt. % | Sodium Benzoate, Wt. % | K/S Color |
|---|---|---|---|
| 66 | 33 | 1.0 | 12.72 |
| 73 | 26 | 1.0 | 8.07 |
| 79 | 20 | 1.0 | 3.81 |
| 86 | 13 | 1.0 | 2.10 |
| 90 | 9 | 1.0 | 1.35 |
| 94 | 5 | 1.0 | 0.60 |
| 78 | 20 | 2.0 | 4.00 |

The above data indicate the effectiveness of the sodium benzoate in comparatively small quantities and that at one weight percent sodium benzoate concentrations in the composition, the presence of the dye receptor becomes particularly effective at concentrations above about 20 weight percent.

EXAMPLE III

Blends of polypropylene and a polymer comprising a 70/30 ethylene/N,N-dimethylaminoethyl methacrylate copolymer as the dye receptor were prepared, the blends containing 7 percent of the dye receptor. The blends of these polymers were printed, as fibers, with various dyes using 1 percent dye in a dye paste.

To like samples of the same blends, 1 weight percent sodium benzoate was added and the blends of these polymers were printed as fibers, under substantially identical conditions. Results were as follows:

| K/S Values Upon Printing* | Sodium Benzoate in Fiber, Weight Percent: | |
|---|---|---|
| | 0 | 1 |
| With Isolan Red 2G[1] | 10.2 | 15.4 |
| With Isolan Yellow NW[1] | 11.2 | 20.8 |
| With Merpacyl Blue 2GA[2] | 11.6 | 15.6 |

*Color Index Numbers
[1]No number listed, neutral premetallized dyes by Verona Dyestuffs, Div. of Verona-Pharma Chemical Corp., Union, N.J.
[2]62125.

These data indicate that the inclusion of the benzoic acid metal salt is effective with a variety of dyes.

The compositions of this invention are particularly employable as melt-spun fibers because of the depth of dye penetration effected by the components of the composition. As such they are particularly suitable for fabrics subjected to frequent dry cleaning because of the dry cleaning fastness of these fibers.

It has also been found that the dyeability of olefin polymer fibers containing a polymer dye receptor and a carboxylic acid metal salt of the nature defined are not appreciably affected by heat and ultraviolet exposure as compared to similarly treated olefin polymer fibers containing the polymer dye receptor but not containing the carboxylic acid metal salt. The fiber of this invention, when given a heat stabilization step, will not be adversely affected by the subsequent thermal treatment normally required during processing of the fiber.

For convenience, heat stabilization of the fibers of the examples was accomplished by steaming in an autoclave. Commercially, the heat stabilization can be by heat setting such that the dyeable fiber will be maintained at a higher temperature for a much longer period than is usually the case in fiber line drawing.

These improved characteristics of the fibers of this invention are shown by the following:

EXAMPLE IV

Fiber 12 was a polypropylene fiber containing the aforementioned 7% by weight of du Pont's Acid Dye Additive PB 7007 and 1% by weight of sodium benzoate.

Fiber 6 was the same polypropylene fiber containing 7% by weight of du Pont's Acid Dye Additive PB 7007.

Under substantially identical conditions, the fibers were exposed for 20 standard fading hours to a carbon arc and were then dyed, in pairs, in competitive dyeing with an unexposed sample of the same composition, the resulting dye uptake being as follows:

| Fiber | K/S Value | |
|---|---|---|
| | Untreated | Treated |
| 12 | 17.9 | 12.2 |
| 6 | 18.8 | 5.7 |

The above data indicate that not only did Fiber 12 undergo a smaller change in dyeability but its dyeability after treatment was considerably greater than that of the non-invention fiber.

The fibers, as described, were heated in an autoclave at 212° F. for an identical period of time. The fibers were then dyed in competitive dyeing, in pairs, with the following results:

| Fiber | K/S Value | |
|---|---|---|
| | Untreated | Treated |
| 12 | 16.3 | 18.2 |
| 6 | 19.0 | 11.6 |

Again, the superiority of the fiber of this invention is indicated.

Under substantially identical conditions, the fibers were heated in an autoclave at 212° F. to heat-stabilize them and then exposed for 20 standard fading hours to a carbon arc and thereafter competitively dyed. Results were as follows:

| Fiber | K/S Value | |
|---|---|---|
| | Untreated | Treated |
| 12 | 14.8 | 14.7 |
| 6 | 17.9 | 4.3 |

The superiority of the fiber of this invention is again indicated.

It will be evident from the foregoing that various modifications can be made to the method of this invention. Such, however, are considered to be within the scope of the invention.

The compositions in the preceding examples all contained additives not specifically named. In Examples I and II, the compositions contain stabilizing amounts of dilaurylthiodipropionate (0.25 weight percent based on the polypropylene) and 2,4-bis(4-hydroxy-3,5-di-t-butylphenoxy)-6-(n-octylthio)-1,3,5-triazine (0.08 weight percent based on the polypropylene) as antioxidants and 0.05 weight percent calcium stearate (based on the polypropylene) as a processing aid. In Examples III and IV, the compositions contain stabilizing amounts of tetrakis [methylene(3,5-di-t-butyl-4-hydroxyhydrocinnamate)]methane (0.05 weight percent) and distearylthiodipropionate (0.2 weight percent) as antioxidants, 2(2'-hydroxy-3',5'-di-t-amylphenyl)benzotriazole (0.5 weight percent) as a UV stabilizer and calcium stearate (0.05 weight percent) as a processing aid.

Based upon the preceding examples, one presently preferred polypropylene composition consists essentially of 66 to 89 weight percent polypropylene, 10 to 33 weight percent of a polyamide dye receptor, 0.25 to 2 weight percent of a carboxylic acid metal salt, specifically sodium benzoate, and the balance being conventional antioxidants, a UV stabilizer and a processing aid. Another presently preferred polypropylene composition containing a different dye receptor consists essentially of 90 to 93 weight percent polypropylene, 6 to 8 weight percent of ethylene/N,N-dimethylaminoethyl methacrylate copolymer, and 0.25 to 1 weight percent of a carboxylic acid metal salt, specifically sodium benzoate, with the balance being conventional antioxidants, a UV stabilizer and a processing aid.

I claim:
1. A composition of matter which comprises:
   (a) an alpha-monoolefin polymer;
   (b) a polymeric dye receptor which when incorporated in a composition comprising said alphamonoolefin polymer improves the acid dyeability of said composition; and

(c) a Group IA metal salt of a carboxylic acid selected from the group consisting of benzoic acid, p-t-butylbenzoic acid, phenylacetic acid mellitic acid, 1,8-naphthalic acid, and o-phthalic acid.

2. A composition of matter in accordance with claim 1 wherein said Group IA metal salt comprises sodium benzoate.

3. A composition of matter in accordance with claim 2 wherein said alpha-monoolefin polymer is polypropylene.

4. A composition of matter in accordance with claim 3 wherein said polymeric dye receptor comprises a copolymer of ethylene and N,N-dimethylaminoethyl methacrylate.

5. A composition of matter in accordance with claim 3 wherein said polymeric dye receptor comprises a copolymer of ethylene and an amino alkyl acrylate.

6. A composition of matter in accordance with claim 1 wherein said polymeric dye receptor comprises a copolymer of ethylene and N,N-dimethylaminoethyl methacrylate.

7. A composition of matter in accordance with claim 1 wherein said polymeric dye receptor comprises a copolymer of ethylene and an amino alkyl acrylate.

8. A composition of matter in accordance with claim 1 wherein said polymeric dye receptor is selected from the group consisting of polyamides which are polycondensates of cyclic amides; polyamides which are polycondensates of aliphatic diamines with dicarboxylic acids; polyurethanes; polyureas; polyesters which are polycondensates of alkylene glycols with dicarboxylic acids; reaction products of polyalkyleneimines containing 2 to 20 carbon atoms with a substance selected from the group consisting of chlorinated paraffin waxes, diisocyanates, lower aliphatic acid anhydrides, hydrohalogen acids and monobasic fatty acid chlorides; and thermoplastic polymers of vinyl-substituted mono- and polycyclic pyridine bases.

9. A composition of matter in accordance with claim 8 wherein said polymeric dye receptor is present in a dye-enhancing amount up to about 50 weight percent of said composition of matter and said Group IA metal salt is present in a dye-enhancing amount up to about 3 weight percent of said composition of matter.

10. A composition of matter in accordance with claim 9 wherein said Group IA metal salt comprises sodium benzoate.

11. A composition of matter in accordance with claim 10 wherein said alpha-monoolefin polymer is polypropylene.

12. A composition of matter in accordance with claim 11 wherein said polymeric dye receptor is a polyamide.

13. A composition of matter in accordance with claim 12 wherein said polypropylene is present in an amount within the range of about 66 to about 89 weight percent of said composition of matter, said polyamide is present in an amount within the range of about 10 to about 33 weight percent of said composition of matter, and said sodium benzoate is present in an amount of up to about 3 weight percent of said composition of matter.

14. A composition of matter in accordance with claim 13 wherein said polyamide comprises nylon-6,6, nylon-6,10 and nylon-6 in a weight ratio of about 40:40:20.

15. A composition of matter in accordance with claim 13 wherein said polyamide comprises nylon-6,6.

16. A composition of matter in accordance with claim 12 consisting essentially of 66 to 89 weight percent polypropylene, 10 to 33 weight percent polyamide, 0.25 to 2 weight percent sodium benzoate, 0.005 to about 1 weight percent of a hindered phenolic antioxidant, 0.02 to about 3 weight percent of a diester of beta,beta'-dithiopropionic acid, 0.005 to about 2 weight percent of an alkaline earth metal stearate processing aid, and 0.01 to about 2 weight percent of a hydroxybenzotriazole as a UV stabilizer.

17. A composition of matter in accordance with claim 16 wherein said hindered phenolic antioxidant is tetrakis [methylene(3,5-di-t-butyl-4-hydroxyhydrocinnamate)]methane, wherein said diester is distearylthiodipropionate present in an amount in the range of 0.05 to about 1.5 weight percent, wherein said alkaline earth metal stearate processing aid is calcium stearate present in an amount in the range of 0.02 to about 0.5 weight percent, and wherein said hydroxybenzotriazole is 2(2'-hydroxy-3',5'-di-t-amylphenyl)benzotriazole present in an amount in the range of 0.25 to 1.5 weight percent.

18. An article formed of a composition of matter in accordance with claim 1 which has been heat stabilized.

19. An article formed of a composition of matter in accordance with claim 1 which has been heated to at least about 212° F. to stabilize the dyeability of the article.

20. A composition of matter which comprises:
(a) an alpha-monoolefin polymer;
(b) a dye-enhancing amount up to 50 weight percent of an ethylene/N,N-dimethyl-aminoethyl methacrylate copolymer dye receptor;
(c) a dye-enhancing amount up to 3 weight percent of a Group IA metal salt of carboxylic acid selected from the group consisting of benzoic acid, p-t-butylbenzoic acid, phenylacetic acid, mellitic acid, 1,8-naphthalic acid, and o-phthalic acid.

21. A composition of matter in accordance with claim 20 wherein said alpha-monoolefin polymer is polypropylene.

22. A composition of matter in accordance with claim 21 wherein said metal salt is sodium benzoate.

23. A composition of matter in accordance with claim 22 wherein said polypropylene is present in an amount in the range of about 89.5 to about 97 weight percent of said composition, said copolymer is present in an amount within the range of about 3 to about 10 weight percent of said composition, and said sodium benzoate is present in an amount within the range of about 0.25 to about 1 weight percent of said composition.

24. A composition of matter in accordance with claim 22 wherein said polypropylene is present in an amount of about 92 weight percent of said composition, said copolymer is present in an amount of about 7 weight percent of said composition, and said sodium benzoate is present in an amount of about 1 weight percent of said composition.

25. A composition of matter in accordance with claim 22 consisting essentially of 90 to 93 weight percent polypropylene, 6 to 8 weight percent of said copolymer, 0.25 to 1 weight percent of sodium benzoate, 0.005 to about 1 weight percent of a hindered phenolic antioxidant, 0.02 to about 3 weight percent of a diester of beta,beta'-dithiopropionic acid, 0.005 to about 2 weight percent of an alkaline earth metal stearate processing aid, and 0.1 to about 2 weight percent of a hydroxybenzotriazole as a UV stabilizer.

26. A composition of matter in accordance with claim 25 wherein said hindered phenolic antioxidant is tetrakis [methylene(3,5-di-t-butyl-4-hydroxyhydrocinnamate)]methane, wherein said diester is distearylthiodipropionate, said diester being present in the range of 0.05 to about 1.5 weight percent, wherein said alkaline earth metal stearate processing aid is calcium stearate, said calcium stearate being present in the range of 0.02 to about 0.5 weight percent, and wherein said hydroxybenzotriazole is 2(2'-hydroxy-3',5'-di-t-amylphenyl)-benzotriazole which is present in the range of 0.25 to 1.5 weight percent.

27. A composition of matter in accordance with claim 20 wherein said metal salt is sodium benzoate.

28. A composition of matter in accordance with claim 20 in which said composition is heat stabilized.

29. Polypropylene compositions consisting essentially of (a) polypropylene; (b) copolymer consisting essentially of ethylene and an amino alkyl acrylate compound, the content of said copolymer being 1 to 40 weight percent based upon the weight of the blend of said polypropylene and said copolymer; and (c) sodium benzoate, the content of sodium benzoate being 0.25 to 3 weight percent based on polypropylene.

30. Polyolefin compositions according to claim 29 wherein said aminoalkyl acrylate compound is N,N-dimethylaminoethyl methacrylate.

31. A composition of matter in accordance with claim 1 wherein said polymeric dye receptor is a resinous polymeric dye receptor.

32. A composition of matter in accordance with claim 1 wherein said polymeric dye receptor is a polymer having pendent groups containing or consisting of amide groups.

* * * * *